United States Patent [19]
Hahn et al.

[11] Patent Number: 5,301,412
[45] Date of Patent: Apr. 12, 1994

[54] VIBRATION DAMPER

[75] Inventors: Albin Hahn, Schonungen; Günther Braun, Geldersheim; Helmut Baalmann, Bergrheinfeld; Horst Müller, Munnerstadt; Klaus Kupfer, Schweinfurt, all of Fed. Rep. of Germany

[73] Assignee: Fichtel & Sachs AG, Schweinfurt, Fed. Rep. of Germany

[21] Appl. No.: 875,458

[22] Filed: Apr. 29, 1992

[30] Foreign Application Priority Data
May 2, 1991 [DE] Fed. Rep. of Germany ....... 4114307

[51] Int. Cl.$^5$ .............. B23P 11/00; F16F 9/46
[52] U.S. Cl. ..................... 29/434; 29/527.1; 188/299
[58] Field of Search ............... 29/434, 527.1; 188/299

[56] References Cited

FOREIGN PATENT DOCUMENTS

| | | |
|---|---|---|
| 3434877 | 4/1986 | Fed. Rep. of Germany . |
| 3939012 | 5/1991 | Fed. Rep. of Germany . |
| 9108291 | 10/1991 | Fed. Rep. of Germany . |
| 4031760 | 4/1992 | Fed. Rep. of Germany . |
| 2665497 | 2/1992 | France . |
| 2667666 | 4/1992 | France . |

Primary Examiner—Timothy V. Eley
Attorney, Agent, or Firm—Brumbaugh, Graves, Donohue & Raymond

[57] ABSTRACT

A casing tube of a vibration damper is provided with a connecting sleeve extending substantially radially from the radially outer circumferential surface of the casing tube. At the location where the connecting sleeve is fastened to the casing tube, the casing tube is provided with a planar face area.

21 Claims, 7 Drawing Sheets

VIBRATION DAMPER

BACKGROUND OF THE INVENTION

This invention refers to a vibration damper. Such vibration dampers are used in motor vehicles for damping the oscillations between the body work of the motor vehicle on the one hand and the wheels of the motor vehicles on the other hand.

More particularly the invention refers to the so-called twin tube vibration dampers or oscillation dampers which comprise a pressure tube and a casing tube surrounding the pressure tube.

In modern vibration dampers it is frequently necessary to provide on the radially outer side of the casing tube a flow control unit and more particularly a bypass valve unit. This flow control unit is used for controlling the flow of a damping fluid within the vibration damper. The flow control unit can be controlled by external signals, for example, electrical signals such as to alter the flow conditions of the damping fluid within the vibration damper. For example, it is possible to provide such a flow control unit in a bypass flow path bypassing a primary flow path which extends through a piston unit of the vibration damper. By opening or closing the flow control unit the bypass flow path can be either opened or closed. Opening of the bypass flow path has the effect that a softer damping station is obtained, whereas closing of the bypass flow path has the effect of obtaining a harder damping.

The flow control units and, more particularly, bypass valve units are frequently to be provided on a radially outer surface of the vibration damper and more particularly on the radially outer surface of a casing tube in case of a twin tube vibration damper.

STATEMENT OF THE PRIOR ART

Hitherto the connection between the casing tube and a bypass valve unit has been established through a connecting sleeve member. This connecting sleeve member has been welded to the radially outer surface of the casing tube. The bypass valve unit has been fixed to the connecting sleeve member by screw means. One end of the connecting sleeve member which is to be welded to the case tube was adapted in shape to the cylindrical outer surface of the casing tube such as to substantially follow this radially outer surface of the casing tube. In such case even small manufacturing inaccuracies in the end face of the connecting sleeve member or in the radially outer surface of the casing tube result in gaps between the connecting sleeve member and the radially outer surface of the casing tube. These gaps are difficult to be closed when welding the connecting sleeve member to the radially outer surface of the casing tube.

From German patent 34 34 877 such a known embodiment can be seen particularly in FIG. 1 of this German patent. One recognizes in FIG. 1 an elliptical welding seam which can only with high difficulties be obtained by automatic welding machines. In case of using the so-called protective gas welding method local heat input results in a deformation of the casing tube such that this casing tube must be subsequently straightened again.

Fastening of the connecting sleeve members to the casing tube is particularly difficult in cases in which two bypass valve units are to be provided on the radially outer side of the casing tube. In such case the fastening of the respective connecting sleeve members is particularly difficult. This is particularly true if the connecting sleeve members are to be provided at close distance. As a result thereof, it is necessary to maintain a certain minimum distance between two connecting sleeve members in order to be able to weld the connecting sleeve members to the casing tube also in the area between the connecting sleeve members. Otherwise one could not correctly position the welding tool with respect to the location of the welding seam to be made.

OBJECT OF THE INVENTION

It is an object of the present invention to provide a vibration damper in which the fastening of the connecting sleeve member to the casing tube is facilitated. A further object is to obtain perfect welding or bracing seams between the connecting sleeve members and the casing tube. A further object is to allow close locations of two or more connecting sleeve members on one casing tube. A further object is to provide an easy method of manufacturing a basic unit of a vibration damper which basic unit comprises a casing tube and at least one connecting sleeve member.

SUMMARY OF THE INVENTION

A vibration damper comprises a pressure tube having an axis and a casing tube surrounding the pressure tube. An annular chamber is defined radially between the pressure tube and the casing tube. A piston unit is provided inside the pressure tube. A piston rod member is connected with the piston unit. The piston unit separates two working chambers from each other within the pressure tube. At least one flow path is defined within the vibration damper. At least one connecting sleeve member is provided on a radially outer surface of the casing tube. The connecting sleeve member has a sleeve axis and is adapted for fastening a fluid control unit to the vibration damper. The fluid flow control unit is adapted for influencing the flow conditions along the at least one fluid flow path.

The radially outer surface of the casing tube is provided with at least one substantially planar face area. The at least one connecting sleeve member is fastened to the casing tube substantially within the at least one substantially planar face area.

It is to be noted that this invention is also applicable to other types of vibration dampers besides the above mentioned twin tube vibration dampers. It is further to be noted that the basic concept of this invention i.e., the provision of a substantially planar face area can be used for providing other components on vibration dampers besides the above mentioned fluid flow control units.

According to the present invention the connecting sleeve member can be provided with a substantially planar end face which is located on the substantially planar face area of the casing tube. Both planar faces can be easily manufactured with high precision so that it is easy to fasten, thereafter, the connecting sleeve member onto the casing sleeve.

While it is possible to shape the substantially planar face area at a location radially inward of the cylindrical radially outer surface of the casing tube it is of high advantage if the at least one substantially planar face area is located radially outwards from the radially outer surface of the casing tube. This can be made by known methods of cold shaping and, more particularly, sheet metal shaping such as deep drawing. The advantage of the location of the substantially planar face area radially outwards from the radially outer cylindrical surface is that the annular chamber is not narrowed and that relatively large planar face areas can be provided even at relatively small outside diameters of the respective casing tube.

Preferably the planar face area is substantially parallel to the axis of the vibration damper.

In consideration of known types of flow control units such as described and illustrated, for example, in the above mentioned German Offenlegungsschrift 34 34 877 it is usually desirable that the substantially planar face area is provided with at least one opening through the casing tube inside the connecting sleeve chamber such as to be able to join the flow control unit to the flow path to be controlled.

As mentioned above the casing tube may be provided with at least two substantially planar face areas for fixing a corresponding number of connecting sleeve members for respective flow control units or other components. It is easy to have these planar face areas in close distance without subsequent problems when welding the respective connecting sleeve members to the casing tube.

Moreover, the at least two substantially planar faces can be angularly offset with respect to each other about the axis of the vibration damper. Such the position of the flow control units or other components may be adapted both to the requirements inside the vibration damper and to the requirements of the space, for example, within a motor vehicle construction which is available for accommodating the respective vibration damper. This space may be particularly narrow within a wheel housing of a motor vehicle. The at least one connecting sleeve member and the casing tube may be provided with respective positioning means engageable with each other. These positioning means may be such as to define a predetermined location of the connecting sleeve member with respect to the casing tube both in axial direction and in circumferential direction about the axis of the vibration damper. Such the location of the connecting sleeve member and the respective flow control unit may be exactly defined with respect to the shape of the casing tube. More particularly, the connecting sleeve member may have an annular projection engaging into an opening provided within the at least one substantially planar face area. By the engagement of this annular projection with the edge surface of a respective opening a contact may be obtained which is of high value in connection with a welding operation to be discussed later. Moreover, by this engagement a reliable support of the connecting sleeve member with respect to the sleeve tube is obtained in view of possible external forces acting onto the connecting sleeve member or onto the respective flow control unit.

The fastening of the connecting sleeve member to the casing tube may be further improved if the annular projection is surrounded by a shoulder face surrounding the annular projection radially outwards of the annular projection with respect to the sleeve axis. This shoulder face may be engageable with an abutment face. The abutment face may again be located within the substantially planar face area and may be either parallel or substantially co-planar with the substantially planar face area.

In case of the provision of the above mentioned positioning means the positioning of the connecting sleeve member with respect to the casing tube is very simple and can be performed without auxiliary devices.

According to a further embodiment the connecting sleeve member may have an end face substantially orthogonal with respect to the sleeve axis and this end face may be brought in contact with the substantially planar face area, so as to obtain a so-called "butt joint". This embodiment has the advantage that the opening to be aligned with the bypass valve unit can be manufactured with relative large tolerances and that the connecting sleeve member can be more easily manufactured. The connecting sleeve member may, in this case, have an internal diameter which is larger than the diameter of respective opening through the planar face area. This allows still larger tolerances.

The connecting sleeve member may be fastened to the casing tube by welding or brazing or similar methods. In all cases the fastening of the connecting sleeve member to the casing tube is facilitated. This is particularly true if the connecting sleeve member is to be fastened to the casing tube by a welding operation. No problems with respect to tightness occur in such a welding operation because the respective faces of the connecting sleeve member and the casing sleeve can be easily manufactured with perfect shape. There are no difficulties to apply welding and brazing methods even if a plurality of connecting sleeve members are to be located in close relationship.

It is particularly possible to fasten the connecting sleeve member on the casing tube by a welding operation according to the capacitor discharge welding method. This is a method which can be easily performed within an automatic manufacturing cycle. There exist no visible welding seams and particularly no welding seams which could require a further treatment. No deformations of the casing tube and/or the connecting sleeve member can occur because the input of welding heat is substantially evenly distributed around the axis of the connecting sleeve member. A most important advantage is, however, that due to the possible precise adaptation perfectly tight seals can be obtained by easily performable welding methods.

The invention further refers to a method of manufacturing a vibration damper and more particularly a unit comprising a casing sleeve and a connecting sleeve member which unit may be later used for a vibration damper or for other similar devices.

This method comprises the following steps:

a) a substantially cylindrical casing tube is provided;

b) the substantially cylindrical casing tube is reshaped such as to be provided with at least one substantially planar face area at a location of the radially outer surface thereof;

c) a connecting sleeve member is connected to said casing tube within said at least one substantially planar face area.

The connecting sleeve member may be connected to the casing tube by welding or bracing.

The welding operation may be performed by electric current passing through a contact zone of the casing tube and the connecting sleeve member e.g. according to the capacitor discharge welding method. According to this method the connecting sleeve member is connected with one pole and the casing tube is connected with the other pole of a capacitor discharge circuit such that a current pulse occurring after closing the discharge circuit heats the engaged contact faces of the connecting sleeve member and the casing tube with the result that material is welded at the contact faces.

In case an opening is required for connecting a flow control unit to an internal flow path within the vibration damper this opening may be provided within the substantially planar face area inside the connecting sleeve member before or after connecting the connecting sleeve member with the casing tube.

This substantially planar face area may be obtained by usual metal shaping methods such as deep drawing, stamping, coining and pressing. More particularly, the substantially planar face area is obtained by shaping a radially outward directed dome portion projecting radially outwards beyond the radially outer surface of the casing tube. This dome portion provides at its radially outer end the substantially planar face area.

The dome portion may be obtained by exerting a radially outward directed pressure onto at least a part of an inner circumferential surface of the casing tube. When applying this radially outward directed internal pressure at least part of the radially outer surface of the casing tube is supported by a supporting surface. This supporting surface is provided with a cavity which cavity is confined by a dome-shaping face. The radially outwards directed pressure acts onto the inner circumferential surface at least within an area corresponding to the dome-shaping surface. The supporting surface is such that it supports the casing tube at least within a surrounding area surrounding the cavity.

While it is possible to shape the dome by a male shaping member entered into the casing tube and thereafter being radially pressed outwarts toward the cavity it is preferable to apply one of the methods of hydro-static shaping: an internal pressure is generated within the casing tube at least within an axial section thereof in which the dome is to be shaped. The supporting face with the cavity is surrounding the casing tube at least within this axial section. Such the casing tube is prevented from radial outward deformation in the complete axial section except for the area corresponding to the cavity. In this area the metal of the casing tube is radially outward dislocated such as to be applied to the dome-shaping face.

The internal pressure may be provided by a body of a substantially incompressible and flowable medium within the axial section. This substantially incompressable and flowable medium may be confined within a compression chamber inside the casing tube. The compression chamber is reduced in volume such as to build up the internal pressure of the medium. The medium may be, for example, a hydraulic oil or a plastic or an elastomeric medium which has good flow properties under high pressure. The compression chamber may be obtained by introducing pressurizing pistons into both ends of the casing tube such as to compress the medium.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENTS

Figure 1:
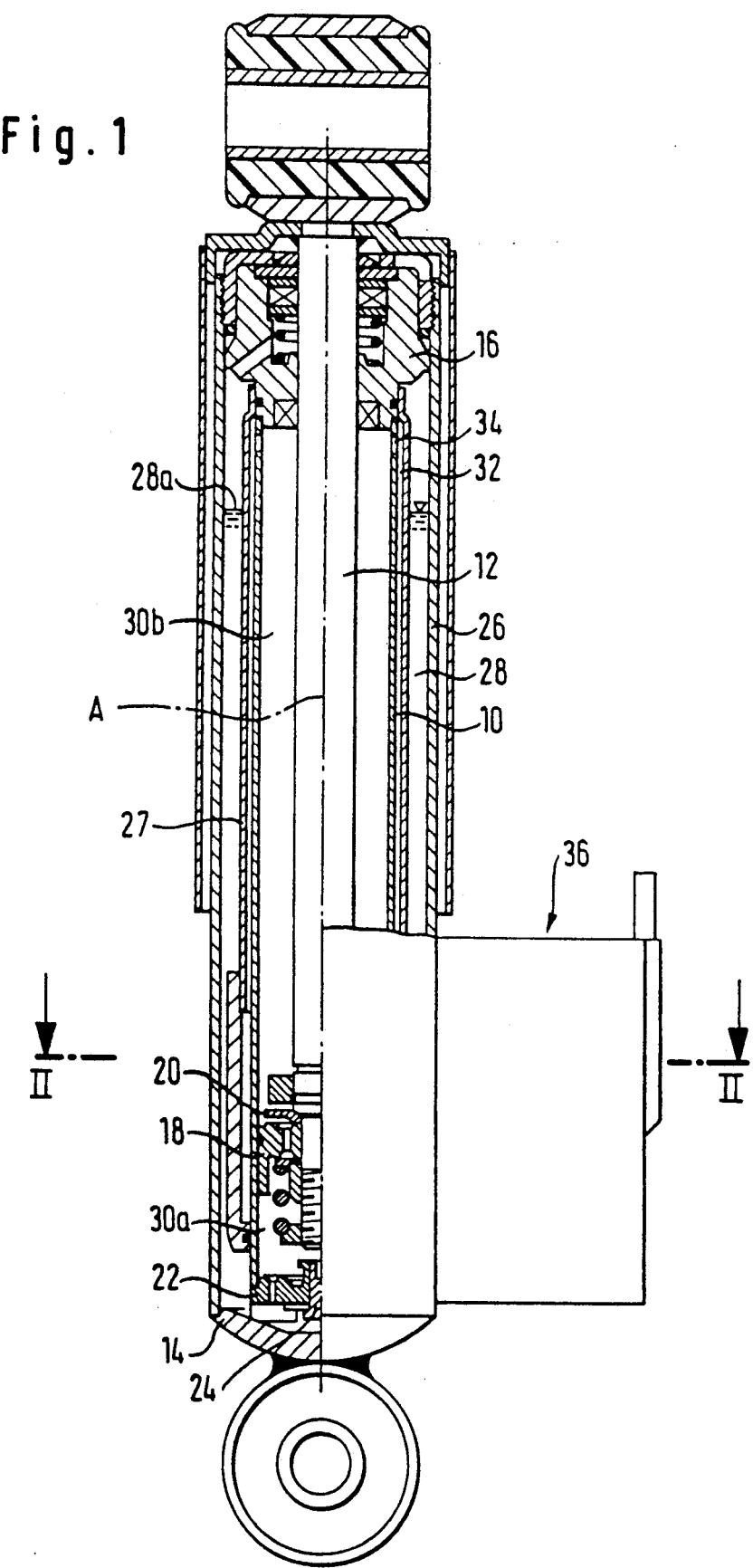
FIG. 1 shows a vibration damper to which the inventive principles can be applied.

FIG. 1 shows the pressure tube 10 of a twin-tube vibration damper having an axis A while the piston rod is identified by reference numeral 12. At the bottom, the pressure tube 10 is closed by a bottom 14. The piston rod 12 extends out of the top end of the pressure tube 10 through a guide and packing unit 16. Inside the pressure tube 10, on the piston rod 12, there is fixed a piston unit 18 with a piston valve arrangement 20. The bottom end of the pressure tube 10 is closed off by a bottom plate 22 with a bottom valve arrangement 24. The pressure tube 10 is enclosed by a casing tube 26. Between the casing tube 26 and the pressure tube 10 there is formed an annular chamber 28 which constitutes a compensating chamber. The space inside the pressure tube 10 is subdivided by the piston unit 18 into a first working chamber 30a and a second working chamber 30b. The working chambers 30a and 30b are filled with a damping liquid. The compensating chamber 28 is filled to the level 28a with liquid and above it with gas. Inside the compensating chamber 28 is a first section, namely a high pressure section 32 which communicates with the second working chamber 30b via a bore 34 in the pressure tube 10. Adjacent this high pressure section 32 is a bypass valve unit 36 mounted on the radially outer side of the casing tube 26. Extending from this (not shown in FIG. 1) is a second section, namely a low pressure section, which extends to the compensating chamber 28 and in fact within its liquid filled zone.

When the piston rod 12 moves upwardly out of the pressure tube 10, the upper working chamber 30b is made smaller. There forms in the upper working chamber 30b an over-pressure which by virtue of the piston valve arrangement 20 can dissipate into the lower working chamber so long as the bypass valve unit 36 is closed (hard damping mode). If the bypass valve unit 36 is opened, then at the same time liquid flows from the upper working chamber 30b through the high pressure section 32 and the bypass valve unit 36 into the compensating chamber 28 (soft damping mode). The damping characteristics of the vibration damper during extension of the piston rod 12 depend therefore upon whether the bypass valve unit 36 is opened or closed.

When the piston rod 12 retracts into the cylinder 10, an over-pressure forms in the lower working chamber 30a. Liquid can then pass upwards through the piston valve arrangement 20 into the upper working chamber 30b. The liquid displaced by the increasing piston rod volume inside the pressure tube 10 is expelled through the bottom valve arrangement 24 into the compensating chamber 28. Since the throughflow resistance of the piston valve arrangement 20 is less than the throughflow resistance of the bottom valve arrangement 24, an increasing pressure likewise occurs in the upper working chamber 30b. This rising pressure can, if the bypass valve unit 36 is open, flow through the high pressure section 32 into the compensating chamber 28. This means that if the bypass valve unit 36 is open the vibration damper, even during retraction, has a softer damping characteristic if the bypass valve unit 36 is open and a harder damping characteristic if the bypass valve unit 36 is closed, just as during extension of the piston rod. The direction of flow through the high pressure section 32 of the bypass is always the same regardless of whether the piston rod is moving in or out.

Figure 2:
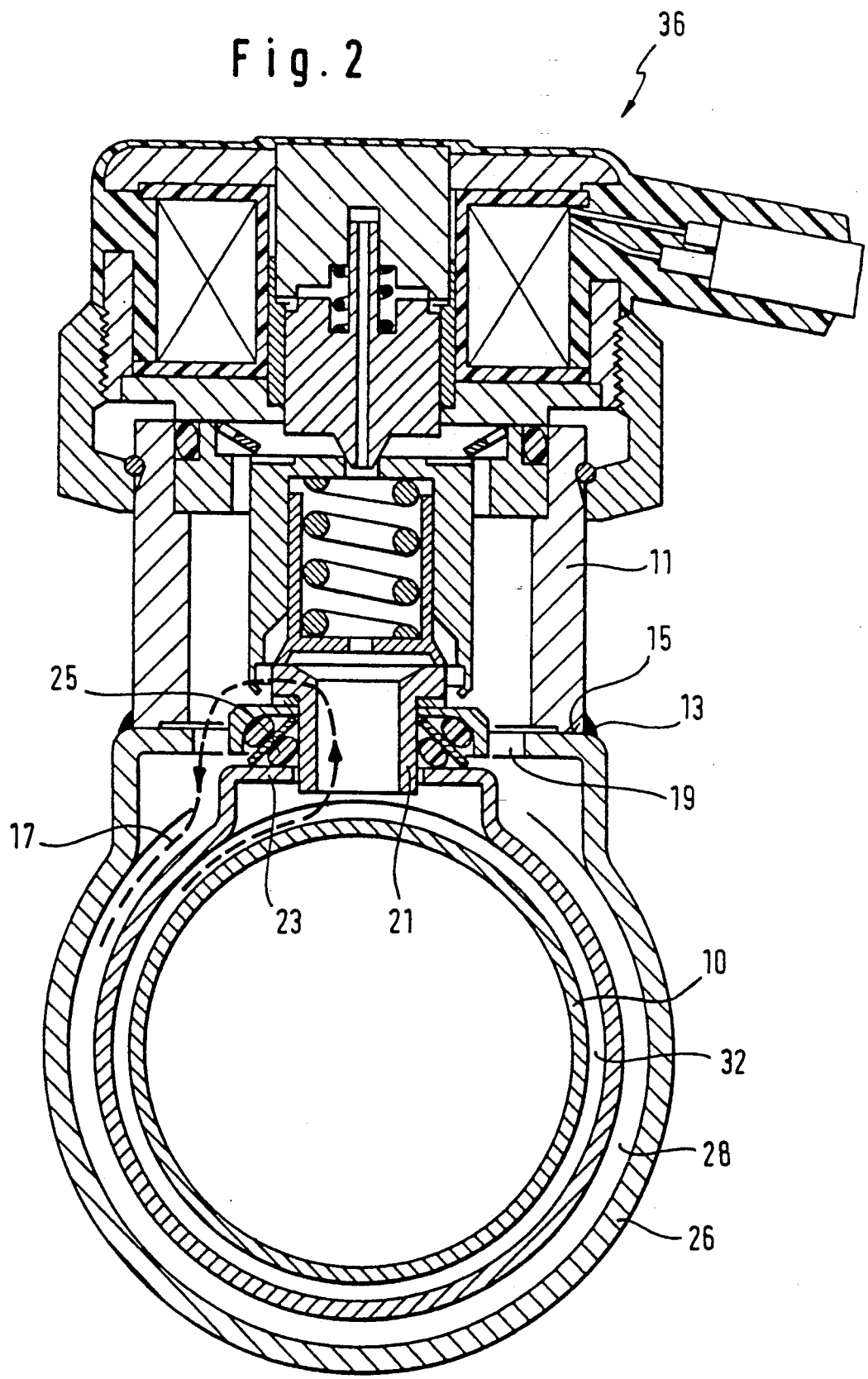
FIG. 2 shows a section through the vibration damper of FIG. 1 according to line II—II of FIG. 1.

In FIG. 2 there is shown a connecting sleeve member 11 which is welded at 13 on a planar surface area 15 of the casing tube 26. An electro-magnetically controlled bypass valve unit 36 is inserted into the connecting sleeve member 11. The flow path as shown in FIG. 2 in dotted line extends from the high pressure section 32 through the bypass valve unit 36 to the annular compensation chamber 28. The bypass valve unit 36 is connected to the annular compensation chamber 28 through an opening 19 provided in the planar face area 15. The high pressure section 32 is connected to the bypass valve unit 36 through a tubular member 21 which passes through a connecting flange portion 23 of a terminal sleeve 29 and is tightened with respect to this connecting flange portion 23 by a sealing arrangement 25.

Figure 3:
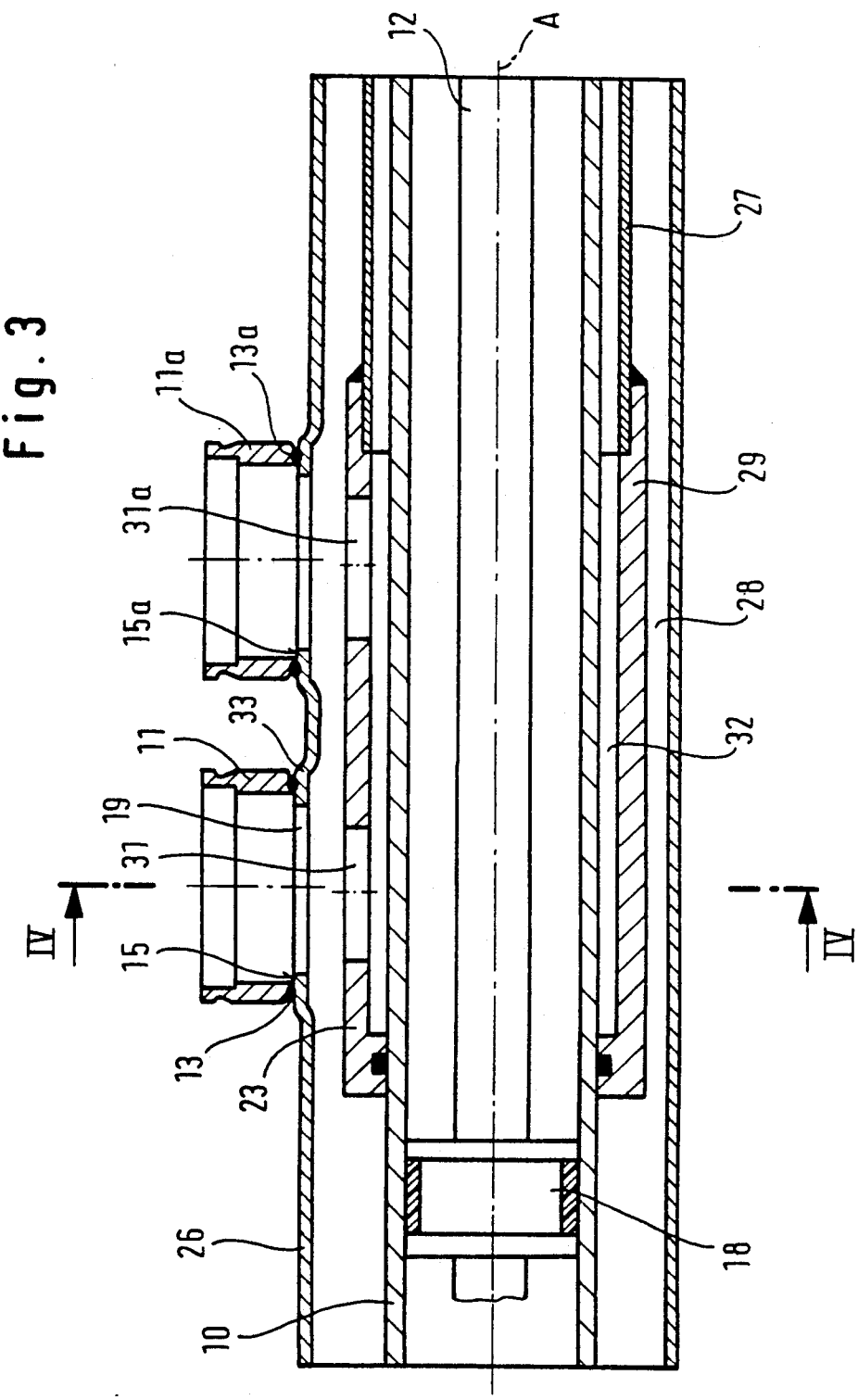
FIG. 3 shows a longitudinal section through a casing tube with connecting sleeve members attached thereto.

FIG. 3 shows a part of the vibration damper with two connecting sleeve members 11,11a. These connecting sleeve members 11,11a are mounted by welding at 13,13a on respective planar face areas 15,15a of the casing tube 26. One can see that the high pressure section 32 is defined radially between the pressure tube 10 and an intermediate tube 27 continued by the terminal sleeve 29. The terminal sleeve 29 is provided with bores 31,31a for receiving the tubular member 21 of the respective bypass valve unit 36.

Figure 4:
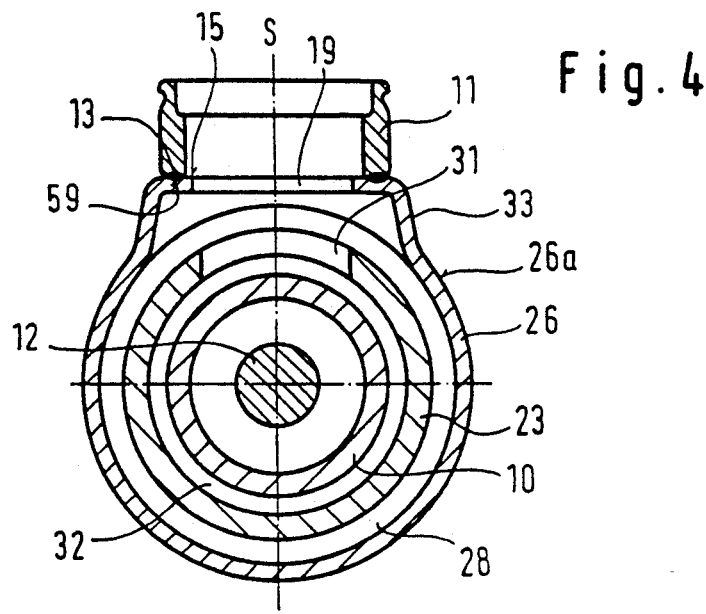
FIG. 4 shows a section corresponding to line IV—IV of FIG. 3.

One recognizes from FIG. 4 that the planar face area 15 of the casing tube 26 is provided by a dome portion 33 of the casing tube 26 and that the connecting sleeve member 11 is in butt-joint connection with the planar face area 15. A welding connection 13 is provided between the connecting sleeve member 11 and the planar face area 15. The dome portion can be easily provided at the casing tube 26. The dome portion is shaped such that a minimum of reshaping work is necessary at the casing tube 26 and that edges between the dome portion 33 and the casing tube 26 are avoided as far as possible. The plane configuration of the face 15 offers the advantage that the lower end of the connecting sleeve member 11 can also be easily and economically provided with a annular end face which is perpendicular to the axis S of the connecting sleeve member 1. The welding connection 13 is preferably obtained by capacitor discharge methods which does not result into thermic deformations of the casing tube 26 and the connecting sleeve member 11. One can see from FIG. 3 that the connecting sleeve member 11 and the further connecting sleeve member 11a are close together. This is possible because due to the application of the capacitor discharge welding method no introduction of a welding tool is necessary towards the welding connections 13,13a, such the space requirements of the vibration damper 1 are reduced.

In an assembling device (not illustrated) the connecting sleeve member 11 is centered with respect to the casing tube 26. Such that the manufacturing process can by easily integrated in an automatic process. Treatment of the welding connections 13,13a is not necessary.

One can see from FIG. 4 that the design and dimension of the planar face area 15 is dependent on the relationship of the diameters of the connecting sleeve member 11 and the casing tube 26. The annular compensation chamber 28 is maintained in full size. In the embodiment as shown in FIG. 4 the planar face area is provided radially outwards of the outer surface 26a of the casing tube 26. Such the dome 33 is obtained which smoothly continues the cylindrical radially outer face 26a of the casing tube 26. When the diameter of the connecting sleeve member 11 is smaller with respect to the diameter of the casing tube 26 the dome 33 can be avoided. In this case the planar face area 15 can be obtained by a coining or pressing operation at the casing sleeve 26. Such the reshaping work is still further reduced.

Figure 5:
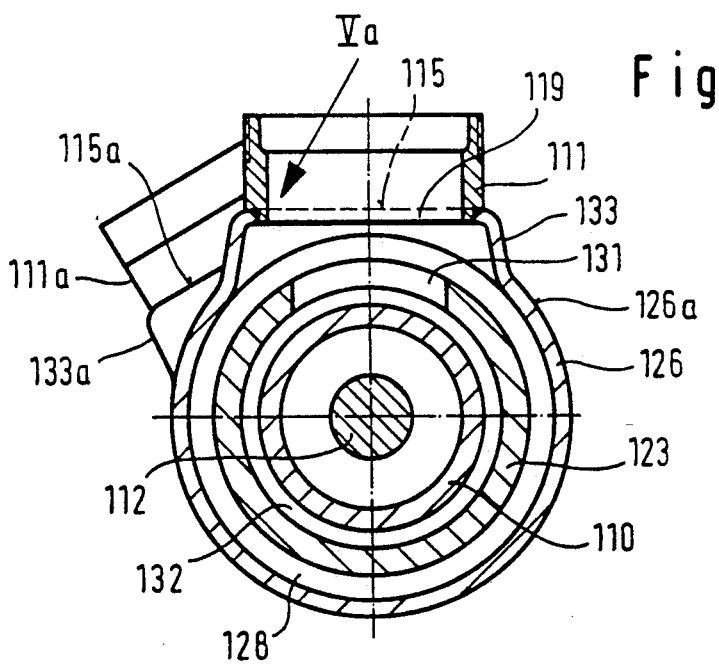
FIG. 5 shows a cross section corresponding to FIG. 4 with a modified embodiment.

In FIG. 5 there is shown a further embodiment. Analogous parts are designated by the same reference numerals as in FIGS. 3 and 4, increased by 100.

Figure 5A:
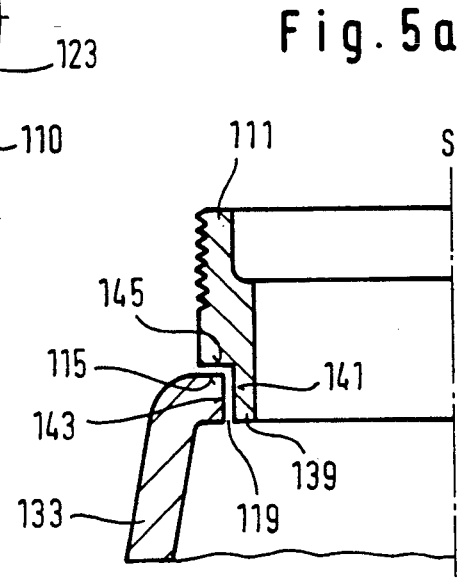
FIG. 5a shows an enlarged cross section at the location Va of FIG. 5.

As one can see from FIG. 5 a further dome 133a is angularly offset with respect to the dome 133 and provides a further planar face area 115a on which a further connecting sleeve member 111a is provided. As one can see from FIG. 5a, in this embodiment a connecting sleeve member 111a is provided with an annular projection 139. This annular projection 139 has a radially outer engagement surface 141 engageable with a radially inner circumferential face 143 of the opening 119. Moreover, the connecting sleeve member 111 is provided with a shoulder face 145 engageable with the planar surface area 115. Such the connecting sleeve member 111 is automatically centered within the opening 119. There exists a large contact face area between the connecting sleeve member 111 and the dome 133. Such the stability of the connection between the connecting sleeve member 111 and the casing tube 126 is increased. The large contact face area between the dome 133 and the connecting sleeve member 111 is available for a capacitor discharge welding.

Due to the fact that the faces 143, 141 on the one hand and the faces 115 and 145 on the other hand are perpendicular with respect to each other the tightness of the welding areas is further increased.

Figure 6:
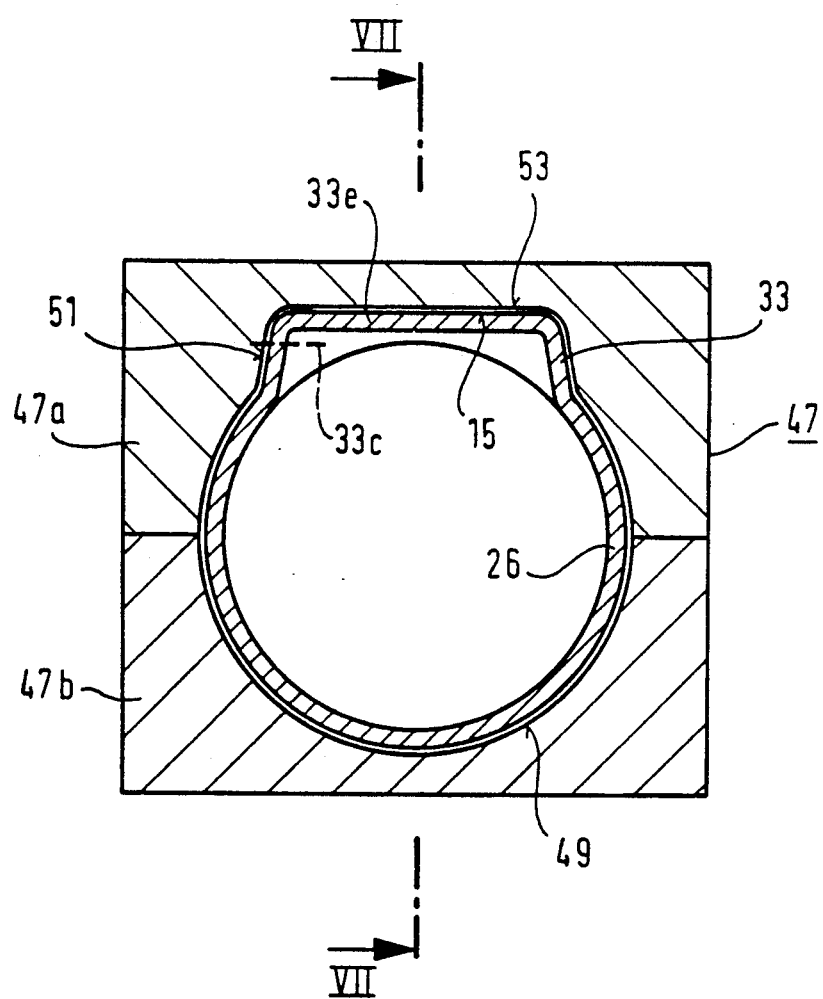
FIG. 6 shows a shaping device for shaping a cylindrical casing tube with a dome portion.
Figure 7:
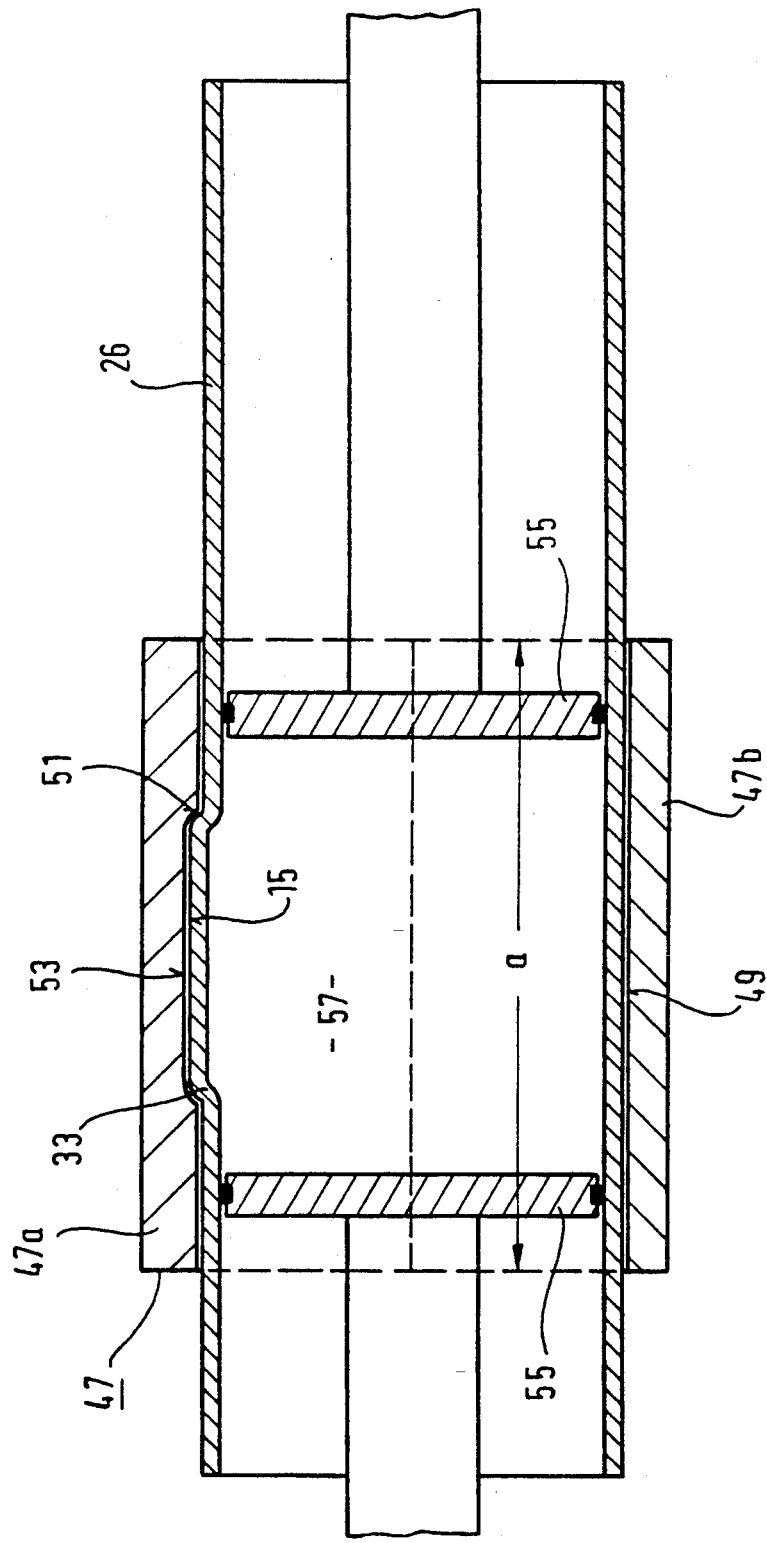
FIG. 7 shows a longitudinal section according to line VII—VII of FIG. 6.

From FIGS. 6 and 7 one can see a preferred method for manufacturing the casing tube 26 with the dome portion 33.

The casing tube 26 in its raw form i.e., without the dome portion 33, is inserted into a divided support form consisting of two support members 47a,47b. The divided support form 47 defines a support face 49 surrounding the casing tube 26. The support form 47 is provided with a cavity joining the support face 49. This cavity 51 has a dome-shaping face 53.

As one can see from FIG. 7 support form 47 surrounds the casing tube 26 along a section a. When the support form 47 is located in correct position with respect to the place, where the dome 33 is to be formed, pressurizing pistons 55 are inserted into the tube casing 26 such as to define a compression chamber 57. This compression chamber 57 is filled with a substantially incompressible and flowable medium which is pressurized by mutually approaching the pressurizing pistons 55. By the internal pressure of the pressurized medium the material of the casing tube 26 is dislocated into the cavity 51 and against the dome-shaping face 53 confining the cavity 51. Such the dome 33 is obtained. Subsequently the opening 19 may be bored or cut into the planar face area 15.

Figure 8:
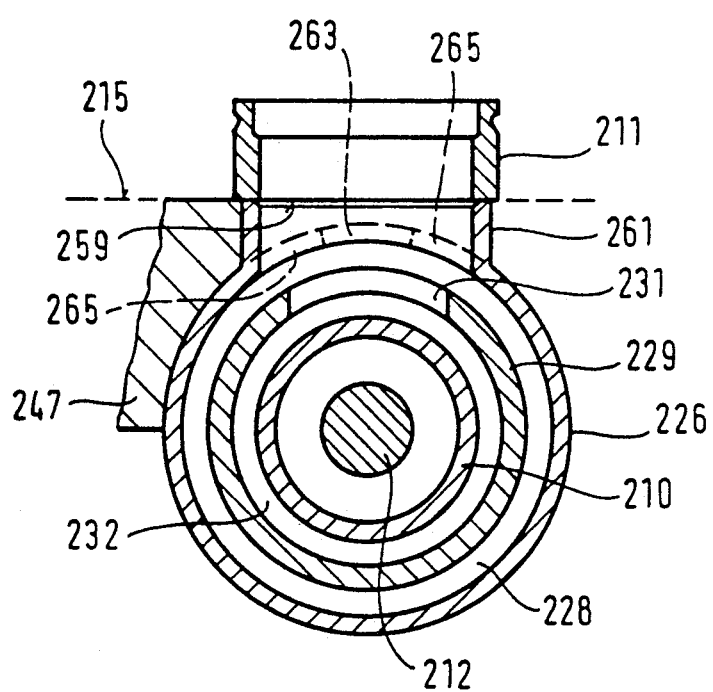
FIG. 8 shows a cross-section corresponding to line IV—IV of FIG. 3 with a further embodiment.

In the modified embodiment according to FIG. 8 analogue parts are designated by the same reference numerals as in the embodiment of FIGS. 1 to 4 increased by 200 or as in the embodiment of FIG. 5 increased by 100.

In the embodiment of FIG. 8 the casing tube 226 is provided with a substantially radially projecting branch tube 261. This branch tube 261 is integral with the casing tube 226 and is provided with a substantially planar end face area 215. The connecting sleeve member 211 is connected by its end face 259 to the planar face area 215. The connection between the connecting sleeve member 211 and the branch tube 261 can be obtained by one of the above-discussed connecting methods such as by electric current passage welding.

The branch tube 261 can be obtained by different methods.

Such it is possible to provide a dome portion 33 such as shown in FIG. 6 and to cut away the end wall 33e by a cutting operation. This cutting operation can be performed by a usual mechanical cutting tool or by a laser beam or by an electron beam according to cutting line 33c of FIG. 6. Alternatively it is also possible to provide a preliminary bore 263 as shown in FIG. 8 and to reshape the peripheral portion 265 into the branch tube 261. This reshaping can be performed, e.g. by drawing a reshaping ball through the preliminary opening 263. The diameter of the reshaping ball should in such case have a diameter substantially corresponding to the inner diameter of the connecting sleeve member 211 to be obtained. It is to be understood that in such case one will again preferably use a support form 247 as indicated in FIG. 8 for obtaining the desired transition from the casing tube 226 to the branch tube 261.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

It is to be noted that according to the invention at least one of the engaged welding faces may define a sharp edge. It is only necessary that this sharp edge is lying in a substantially planar face.

We claim:

1. A method for making a vibration damper having a piston in a pressure tube in a casing tube and at least one bypass valve unit on the casing tube, comprising the steps of:
   producing the casing tube from an initially substantially cylindrical tube, comprising deforming the initially substantially cylindrical tube so as to form at least one substantially planar area on a portion of a radially outer surface of the casing tube, and
   attaching the bypass valve unit to the casing tube via connecting means to the at least one substantially planar area.

2. The method of claim 1, wherein attaching comprises welding or brazing.

3. The method of claim 2, wherein welding comprises capacitor discharge welding.

4. The method of claim 1, further comprising forming a hole in the at least one substantially planar area of the casing tube, before or after attachment of the connecting means.

5. The method of claim 1, wherein the substantially planar area is formed as part of a radially outward projecting dome portion of the casing tube.

6. The method of claim 5, wherein forming the dome portion comprises applying radially outward pressure at least to a portion of a radially inner surface of the initially substantially cylindrical tube, pressure being applied while a supporting surface comprising a dome-shaping portion is disposed opposite on a radially outer surface portion of the initially substantially cylindrical tube.

7. The method of claim 6, wherein applying radially outward pressure comprises applying fluid pressure within at least an axial portion of the initially substantially cylindrical tube.

8. The method of claim 7, wherein applying fluid pressure comprises reducing the volume of a fluid-confining compression chamber within the initially substantially cylindrical tube.

9. The method of claim 5, wherein the radially outward projecting dome portion is formed with a side wall and a substantially planar top wall, thereby forming a flange portion which is coherent with the side wall and which comprises the substantially planar area, and wherein an opening is formed in the top wall.

10. The method of claim 9, wherein forming the opening comprises boring or cutting.

11. The method of claim 5, wherein the radially outward projecting dome portion is formed with a side wall and a top wall, wherein the top wall is separated form the side wall along a separation rim, and wherein the separation rim lies in a separation plane intersecting the side wall and forms the substantially planar area.

12. The method of claim 1, wherein deforming comprises forming an integral, substantially radially projecting branch tube of the casing tube, the branch tube having a substantially planar rim, the planar rim forming the substantially planar area.

13. The method of claim 12, wherein forming the rim comprises cutting.

14. The method of claim 12, wherein forming the branch tube comprises making a preliminary opening in the casing tube and drawing an enlarging tool radially outward through the preliminary opening.

15. The method of claim 1, wherein deforming comprises:
   making a preliminary opening into the casing tube;
   applying the casing tube against a support form having a casing tube support face and, adjoining the casing tube support face, a branch tube shaping passage with an external branch tube shaping face;
   aligning the preliminary opening with the branch tube shaping passage; and
   drawing an enlarging tool in a radially outward direction through the preliminary opening and the branch tube shaping passage, so as to surge an annular area of the casing tube surrounding the preliminary opening against the external branch tube shaping face, thereby forming the branch tube with a substantially planar terminal rim forming the substantially planar area.

16. The method of claim 15, wherein the substantially planar rim is obtained by separating a terminal portion of the branch tube along a separating line lying within a substantially planar separating plane.

17. The method of claim 1, wherein the pressure tube and the casing tube have diameters which are sufficiently different for the substantially planar area to be formed by planarization of a wall portion of the casing tube, free of interference of the planarized wall portion with the pressure tube upon coaxial installation of the pressure tube inside the casing tube.

18. The method of claim 17, wherein planarization comprises coining or pressing.

19. The method of claim 1, wherein a plurality of substantially planar areas are formed on the radially outer surface of the casing tube.

20. The method of claim 19, wherein individual ones of the planar areas are spaced along a longitudinal axis of the vibration damper.

21. The method of claim 19, wherein individual ones of the substantially planar areas are angularly spaced with respect to a longitudinal axis of the vibration damper.

* * * * *